United States Patent [19]
Kobayashi

[11] 3,877,252
[45] Apr. 15, 1975

[54] CENTRIFUGAL TORQUE CONVERTER

[76] Inventor: Saburo Kobayashi, 465, 3-chome, Sekiyata-cho, Niigata-shi, Japan

[22] Filed: Apr. 29, 1974

[21] Appl. No.: 465,257

[52] U.S. Cl. ............ 64/25; 64/24; 192/103 R
[51] Int. Cl. ............................................. F16d 5/00
[58] Field of Search....... 64/25, 24, 6 R; 192/103 R, 192/56 F; 123/139 AP

[56] References Cited
UNITED STATES PATENTS

| | | | |
|---|---|---|---|
| 2,646,150 | 2/1953 | Hobbs | 192/56 F |
| 3,420,345 | 1/1969 | Kobayashi | 64/25 |
| 3,650,125 | 3/1972 | Phillips | 64/25 |
| 3,654,776 | 4/1972 | Jingu et al. | 64/25 |
| 3,774,411 | 11/1973 | Phillips et al. | 64/25 |
| 3,834,184 | 9/1974 | Hofmann et al. | 64/25 |

*Primary Examiner*—Samuel Scott
*Assistant Examiner*—Randall Heald
*Attorney, Agent, or Firm*—Bucknam and Archer

[57] ABSTRACT

A centrifugal torque converter having input and output members and centrifugal weight members disposed therebetween. By the revolution force applied to the input member, the centrifugal weight members are caused to rotate along deformed-circle like guides provided in the output member. The input torque supplied to the input member is effectively amplified and transmitted to the output member by the centrifugal force created by the revolution of the centrifugal weights along the deformed-circle-like guides when the velocity ratio between the input and output members is greater than 1:1.

7 Claims, 3 Drawing Figures

PATENTED APR 15 1975  3,877,252

3,877,252

CENTRIFUGAL TORQUE CONVERTER

BACKGROUND OF THE INVENTION

1. Field of the Invention

This invention relates to a centrifugal torque converter, and more particularly to a centrifugal torque converter of the type which includes one or more centrifugal weights between an input member and an output member such that a torque supplied to the output member is amplified by centrifugal force created by rotation of the weights.

2. Description of the Prior Art

Heretofore, there have been known various centrifugal torque converters of the type mentioned above. An example of such a torque converter is shown and disclosed in U.S. Pat. No. 3,420,345. This torque converter has many advantages which cannot be obtained by the other types of torque converter. The torque converter of the U.S. Pat., however, has disadvantages in performance. For example, a large amount of input energy is consumed by inertial resistance upon a restarting of an annular member after a disengagement of claw clutches. Impulsive sounds occur upon the engagement of the claw clutches. Furthermore, only a small rotation force can be obtained because of the narrow operational angle of the centrifugal force acting in the period from engagement to disengagement of the clutches.

The number of the engaging-disengaging operations of the claw clutches per unit time increases with increase of the difference in the number of revolutions between the input and output shafts. However, since the claw clutches are limited in the number of the complete engaging-disengaging operations which can be performed per unit time, the operational efficiency is low when the difference in the number of revolutions between the input and output shafts is over a given value.

SUMMARY OF THE INVENTION

An object of this invention, therefore, is to provide a novel and improved centrifugal torque converter which is free from the disadvantages mentioned above.

DESCRIPTION OF THE PREFERRED EMBODIMENT

Figure 1:
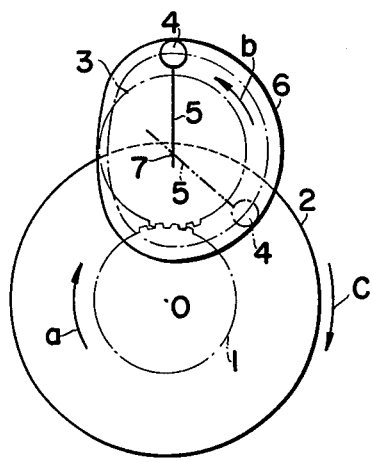
FIG. 1 is a view illustrating the principle in operation of an centrifugal torque converter.

Referring to FIG. 1, reference numerals 1 and 2, respectively, designate an input member and an output member arranged coaxially to each other. The output member 2 has a gear 3 adapted to rotate about a shaft 7 mounted to the output member 2 and to mesh with a gear mounted on the input member 1. The gear shaft 7 has a member 5 attached thereto to rotate together with the gear 3 and to move slidably in a radial direction and having a centrifugal weight 4 secured to a tip of the member 5. The output member 2 also has a deformed-circle-like aperture provided therein apart from the axis of the output member. A inside wall 6 of the aperture serves to guide the centrifugal weight 4 to rotate therealong. As shown in FIG. 1, the curved surface defined by the guiding inside wall 6 of the output member 2 is so formed that the distance from the rotation center of the gear 3 to the curved surface is shorter on the left side than on the right side.

When the ratio of the member of revolutions between the input member 1 and the output member 2, namely, the ratio of velocity therebetween, is larger than 1 : 1, the input member 1 can be considered to rotate relatively to the output member 2. That is, if in FIG. 1 the speed of rotation of the output member 2 is arbitrarily considered to be zero, the speed of rotation of the input member 1 in the direction of an arrow $a$ can be expressed relatively thereto. When the gear of the input member 1 rotates to cause the gear 3 to rotate about the shaft 7, the member 5 and hence the centrifugal weight 4 rotates about the shaft 7 in the direction of an arrow $b$. As mentioned above, since the curved surface defined by the guiding inside wall 6 of the output member 2 is so formed that the distance from the rotation center of the gear 3 to the curved surface is shorter on the left side than on the right side, the centrifugal force of the centrifugal weight 4 acting on the guiding inside wall 6 acts, as a whole, in the direction of an arrow $c$, causing a rotating force to act on the output member 2.

In summary, in the case that the ratio of velocity between the input and output members in the torque converter mentioned above is larger than 1:1, the drive transmission torque from the input member will be effectively amplified by the centrifugal force created by the revolution of the centrifugal weight and then transmitted to the output member.

Figure 2:
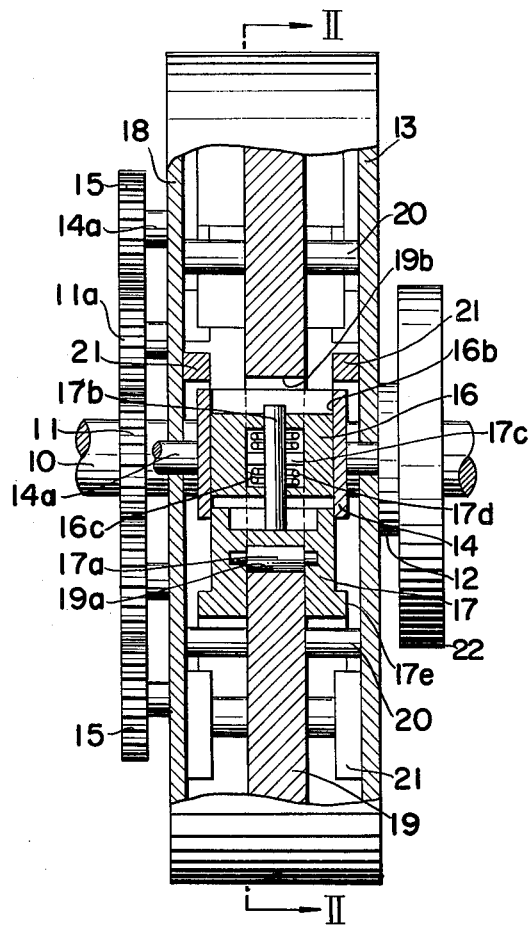
FIG. 2 is a longitudinal sectional view of a centrifugal torque converter constructed according to this invention.

Now, one embodiment of this invention will be explained with reference to the drawings. Referring to FIG. 2, there is shown a centrifugal torque converter according to this invention. This torque converter comprises an input shaft 10 having a gear 11 fixedly mounted thereon. The gear 11 drives three gears 15 through three intermediate gears 11$a$. Each of these gears 15 is fixedly mounted on one of three shafts 14$a$. Each of the shafts 14$a$ has one end portion rotatably inserted into and extended through an associated hole provided in an end plate 18, as shown in the drawings. The end portion of each shaft 14$a$ has an enlarged rotating shaft portion 14 extended therefrom and disposed in a space defined by guiding walls 19$a$ and 19$b$ of each of three apertures provided in a transmission plate 19. The enlarged shaft portion 14 has the opposite end shaft portion extended from the side thereof opposite to the side connected to the one end portion of the shaft 14$a$. The opposite end shaft portion of each of the shafts 14$a$ is rotatably inserted into an output plate 13, as shown in the drawings.

Each of the enlarged rotating shaft portions 14 has a cylindrical hole 16$b$ provided therein in a direction perpendicular to the rotation axis of that shaft portion 14. As shown in FIG. 2, three pistons 16 are slidably disposed in the respective cylindrical holes 16$b$. Each of the pistons 16 is also disposed on a guiding rod 17$b$ connected to one end of one of three centrifugal weights 17. The sliding movement of the piston 16 is limited by providing a cylindrical cavity 16$c$ in the piston 16, securing a spring seat 17$c$ to the intermediate portion of the guiding rod portion positioned in the cavity, and disposing two coiled springs 17$d$ between the spring seat and opposite ends of the cavity, respectively, so that the spring seat normally lies halfway between the opposite ends of the cavity.

Each of the centrifugal weights 17 is divided into two portions at the head portion thereof by a roller 17a. Each of the rollers 17a is adapted to rotate in alternative abutment with the inside guiding walls 19a and 19b of the respective apertures provided in the transmission plate 19.

In this case, the curved surfaces of the inside walls 19a which are on the leading side relative to the rotating direction of the output plate 13 (the direction shown by an arrow b in FIG. 3) are formed to define a large half circle coaxial to the rotating shaft 14. Therefore, the centrifugal weights 17 will push this inside guiding walls 19a by the centrifugal force created thereby, to transmit the revolution force to the transmission plate 19, and hence to output plate 13 through a coupling rod 20.

Figure 3:
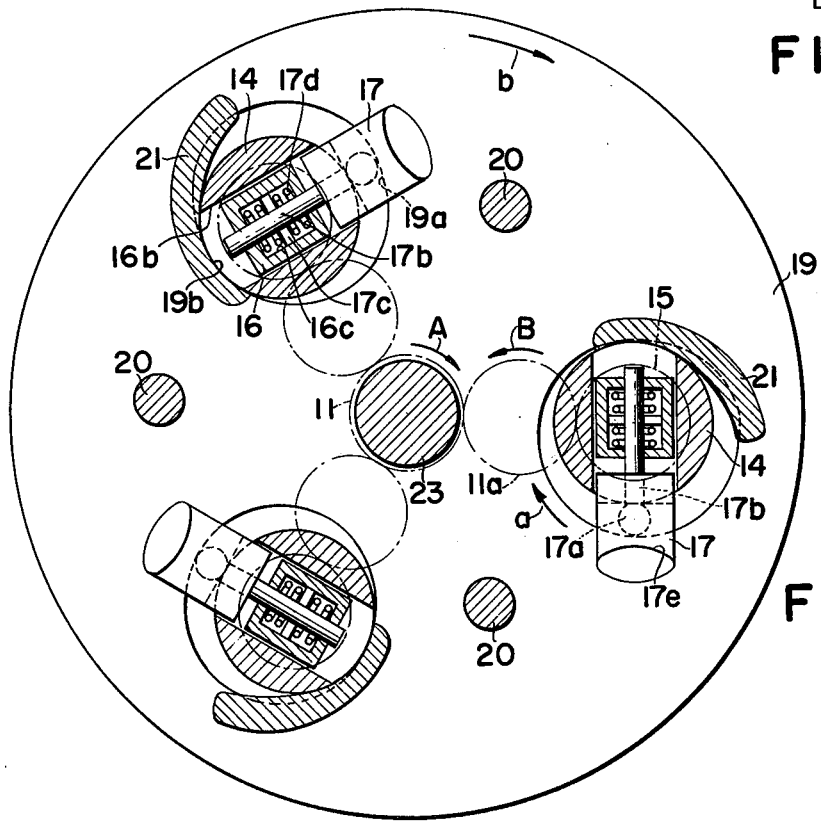
FIG. 3 is a sectional view taken along line II—II in FIG. 2.

On the other hand, the curved surfaces of the inside guiding walls 19b on the side opposite to the side of the rotating direction (this will be called the "non-output side" below), are formed to be adjacent to the rotating shaft 14 and to define a slow curved surface, as shown in FIG. 3. Therefore, when the centrifugal weight contacts the inside wall 19b, the centrifugal weight is pushed into the enlarged rotating shaft 14, whereby the center point of an imaginary arm connecting the centers of gravity of the centrifugal weight 17 and the piston 16 comes to lie close to the center axis of the rotating shaft 14. As a result, the pushing force of the centrifugal weight acting on the inside wall 19b becomes smaller. Therefore, when the centrifugal weight lies on the "non-output side," the revolution force is decreased.

In this case, the coiled springs 17d disposed on both sides of the spring seat 17c as mentioned above act to cause the centrifugal weight 17 and the piston 16 to effectively act. Namely, the elasticity of the spring 17d is so calibrated that when the weight 17 is on the "non-output side" the imaginary line connecting the weight 17 and the piston 16 is divided into two equal halves by the center axis of the rotating shaft 14 and on the other hand when the weight is in the position as shown in FIGS. 2 and 3, the weight 17 and the piston 16 do not become integral with each other and the piston 16 does not act as a counterweight of the centrifugal weight so that sufficient inherent centrifugal force is developed by the weight 17.

The centrifugal weight 17 also has projections 17e provided at both sides of the outer end thereof and adapted to contact guides 21 formed on the respective inner surfaces of the end plate 18 and the output plate 13, as shown in the drawings. By provision of the projections 17e and the guides 21, the weight 17 rotates in contact with the guides 21, so that when the weight 17 moves from "the non-output side" to the output side as shown in FIG. 3, the weight can be easily projected from the rotating shaft 14 by the guidance of the guides 21.

As seen from the above, when transmission is performed in a state where the input and output shafts have a different number of revolutions, an intermittent revolution force is given to the output plate 13 and hence to a flywheel 22 through a output shaft 12, whereby a load such as an automobile is driven by such a revolution force.

In the construction described above and illustrated in FIGS. 2 and 3, the gear 11 of the input shaft corresponds to the input member 1 shown in FIG. 1 and the output plate 13 also corresponds to the output member 2 shown in FIG. 1. It will be obvious from FIG. 1 and the description made with reference thereto that the rotating shaft 14 and hence centrifugal weight 17 is caused to rotate by the rotation of the gear 11 of the input shaft 10, and that the centrifugal force created by the revolution of the weight is given indirectly to the output plate 13 as revolution force.

Referring also to FIG. 3, reference numeral 23 designates a bearing provided in the output plate 13 for holding an extension of the input shaft 10. Also, reference numerals 20 in FIGS. 2 and 3 designate coupling rods joining the end plate 18, the transmission 19 and the output plate 13 together.

As is apparent from the above, the centrifugal force created when the centrifugal weights 17 rotate while pushing the guiding inside walls 19a and 19b of the apertures of the transmission plate 19, acts on the output shaft 12 as revolution force. Furthermore, the centrifugal torque converter of this type has a very wide usable range. For example, by changing the curvature of the curved surface of the guiding inside walls and the distance from the center axis of the rotating shaft to the guiding inside walls, the created centrifugal force can be easily increased or decreased and at the same time the acting direction of the revolution force can be freely changed.

When this centrifugal torque converter is used in an automobile, the difference in the number of revolutions between the input and output shafts decreases with increase of travelling velocity. In this case, the centrifugal weight intends to be in a radial direction from the center axis of the transmission plate 19 by the large centrifugal force created by the high velocity revolution. Therefore, the driving relation between the gears 15 and 11 is locked by such large centrifugal force acting thereto through the rotating shafts 14. As a result, a perfect direct coupling is formed between the input and output shafts.

Furthermore, the curved surfaces of the guiding inside walls can be so formed to prevent the centrifugal weight from reversely rotating, so that a engine braking can be used.

I claim:

1. A centrifugal torque converter comprising axially aligned input and output members; a transmission plate substantially in the form of disc fixedly connected at its center to an end of said output member and disposed in a plane perpendicular ot the axis of said output member, said transmission plate having at least one deformed circular aperture provided therein apart from the axis line of said output member, said at least one aperture containing one shaft disposed eccentrically therein and extending therethrough in a direction parallel to the axis line of said output member, said shaft being driven at its one end by said input member through any suitable means, said shaft having a centrifugal weight mounted thereon to be slidable in a direction normal to said shaft and to rotate by the rotation of said shaft while contacting with the inner surface of said aperture, so that the distance from said shaft to the center of gravity of said weight changes with the rotation of said weight, whereby the input torque supplied to the input member is amplified and transmitted to said output member by said centrifugal weight when the velocity ratio between the input and the output member is greater than 1:1.

2. A centrifugal torque converter according to claim 1, wherein said shaft has a cylinder provided therein and extending therethrough in a direction perpendicular to the axis of said shaft, and a piston slidably fitted in said cylinder, and wherein said centrifugal weight has a rod extending therefrom and connected to said piston at its one end, whereby when said weight contacts with the inner surface of said aperture close to the axis of said shaft, the distance connecting said weight and said piston is divided into two halves by the center axis of said shaft so as to cause said piston to act as a counterweight to said centrifugal weight.

3. A centrifugal torque converter according to claim 2, wherein said piston has a cylindrical cavity provided therein and said rod extending from said weight extends through said piston and through said cavity provided therein and is slidably mounted on said piston, said rod having a spring seat mounted on the portion thereof within said cavity and two coiled springs disposed thereon at both sides of said spring seat, whereby when said weight contacts with the inner surface of said aperture remote from the axis of said shaft, said weight is not integral with said piston and said piston does not act as counterweight to said centrifugal weight.

4. A centrifugal torque converter according to claim 3, wherein said centrifugal weight has an enlarged portion at its head, and further comprising a pair of plates disposed at both sides of said transmission plate apart therefrom and integral therewith by any suitable means, said pair of plates having guides provided on the surfaces thereof facing said transmission plate and formed to guide said enlarged head portion of said weight so as to cause said weight to project easily apart from said shaft when said weight moves from the inner surface region of said aperture close to said shaft to the inner surface region remote from said shaft.

5. A centrifugal torque converter according to claim 1, wherein said centrifugal weight has an enlarged portion at its head, and further comprising a pair of plates disposed at both sides of said transmission plate apart therefrom and integral therewith by any suitable means, said pair of plates having guides provided on the surfaces thereof facing said transmission plate and formed to guide said enlarged head portion of said weight so as to cause said weight to project easily apart from said shaft when said weight moves from the inner surface region of said aperture close to said shaft to the inner surface region remote from said shaft.

6. A centrifugal torque converter according to claim 1, wherein each of said shaft has a gear mounted on its end and driven through an intermediate gear by a gear mounted on said input member.

7. A centrifugal torque converter according to claim 1, wherein the inside wall of said aperture is such formed that the distance between the center axis of said shaft and the surface of the inside wall on the leading side relative to the rotating direction of said output member is longer than that between said center axis and the wall surface on the trailing side.

* * * * *